United States Patent [19]
Terai

[11] Patent Number: 5,563,620
[45] Date of Patent: Oct. 8, 1996

[54] HEAD UP DISPLAY INSTALLATION ARRANGEMENT

[75] Inventor: Takehiro Terai, Atsugi, Japan

[73] Assignee: Nissan Motor Co., Ltd., Yokohama, Japan

[21] Appl. No.: 165,905

[22] Filed: Dec. 14, 1993

[30] Foreign Application Priority Data

Dec. 21, 1992 [JP] Japan ..................... 4-340576

[51] Int. Cl.$^6$ ..................... G09G 5/00
[52] U.S. Cl. ..................... 345/7; 340/980; 348/115
[58] Field of Search ..................... 345/7, 8; 340/980; 348/115; 359/630, 631, 632, 633, 13, 14, 48, 49, 50; 353/13, 14

[56] References Cited

U.S. PATENT DOCUMENTS

| | | | |
|---|---|---|---|
| 3,609,023 | 9/1971 | Turboult et al. ..................... | 353/13 |
| 3,709,589 | 1/1973 | Lamb et al. | |
| 4,886,328 | 12/1989 | Iino ..................... | 359/630 |
| 5,008,658 | 4/1991 | Russay et al. ..................... | 359/48 |
| 5,134,548 | 6/1992 | Turner ..................... | 359/48 |

OTHER PUBLICATIONS

Nissan Automotive Service Manual for Model S13, p. 599 (May 1987).
Toyota Automotive Service Manuals for models E-JZS149 and E-UZS141, (1991).

Primary Examiner—Richard Hjerpe
Assistant Examiner—Regina Liang
Attorney, Agent, or Firm—Foley & Lardner

[57] ABSTRACT

An installation arrangement for a head up display for an automotive vehicle has an installment panel which mounts a head up display unit. The installment panel is mounted in a vehicle body such that the display unit is suitably disposed on the driver's side. The head up display is reflected through an opening in a top side of the installment panel to be reflected on a reflective portion of a windshield panel. A wall portion of the installment panel has an access opening for allowing servicing of the display unit. The installation is arranged such that the access opening is covered by a meter and a meter lid for which the display is operative. Thus good appearance is maintained while servicing is simplified.

16 Claims, 5 Drawing Sheets

5,563,620

HEAD UP DISPLAY INSTALLATION ARRANGEMENT

BACKGROUND OF THE INVENTION

1. Field of The Invention

The present invention relates generally to an arrangement for installation of a head up display. Specifically the invention relates to an arrangement for installing a head up display in an automotive vehicle.

2. Description of The Prior Art

It is known to install a so called 'head up' display in an automotive vehicle so as to project instrument readings or the like on a portion of a windshield panel such that a driver may check the display readings without need of looking down. Examples of such head up displays have been described in Nissan Automotive Service Manual for model S13, May 1987, pg. 599 (FIG. 5) and Toyota Automotive Service Manuals for models E-JZS149 and E-UZS141 (FIG. 6).

Referring to FIG. 5, a positioning of a windshield panel 1 relative an installment panel 2 of one such conventional arrangement can be seen. A display unit 3 is installed within the installment panel 2 to project a display through an opening 2a provided in the installment panel 2. The display is projected through a finisher 4 mounted to cover the opening 2a. Within the display unit 3, a housing 5 containing a high luminance fluorescent light 6 and a mirror 7 are provided.

In operation, the fluorescent light 6 outputs display information, such as a speed indication via the mirror 7 to a reflective portion 1a provided on the windshield panel 1 to be reflected to a driver's side of the vehicle interior to be viewed along a line of sight 'a'. The display unit 3 is connected with a meter 8, in this case a speedometer, for receiving speed data. The speedometer has a display portion 9 for direct viewing in addition to the head up display.

According to the conventional arrangement of FIG. 6, a meter 11 has a head up display projector 12 arranged therewithin, the output display (i.e a speed indication) is reflected by a first mirror 13 and a second mirror 15 installed in a head up display unit 14. The image reflected from the second mirror 15 is then reflected through a hologram lens 16 to a reflective portion 17 on a vehicle windshield to be displayed as a displayed image 18 along a drivers line of sight (arrow direction in FIG. 6).

However, the arrangements described above have various drawbacks. For example, in the arrangement of FIG. 5 servicing of the fluorescent light 6 can only be accomplished by removal of the head up display unit 3. Thus, the opening 2a must be made quite large in size. Also, in order to cover the opening 2a, the finisher 4 must also be large. In addition, after such servicing, it becomes necessary to readjust the alignment of the reflective elements with respect to the reflective portion 1a to assure proper image display.

In the arrangement of FIG. 6, since the image is projected through a plurality of reflective elements (i.e. the mirrors 13, 15) as well as a hologram lens and the reflective portion 17, a large space is needed for obtaining proper reflective characteristics. Also, a cost of the unit is increased due to the large number of components.

Therefore it has been required to provide a 30 head up display for a vehicle which is small in size and utilizes a minimum of reflective elements for reducing costs and conserving space.

SUMMARY OF THE INVENTION

It is therefore a principal object of the present invention to overcome the drawbacks of the prior art.

It is a further object of the present invention to provide a head up display for a vehicle which is small in size and utilizes a minimum of reflective elements for reducing costs and conserving space.

It is also an object of the invention to provide a head up display which can be serviced without need of readjusting reflective elements thereof.

In order to accomplish the aforementioned and other objects, a head up display installation for a vehicle is provided, comprising: an installment panel having a first opening formed at an upper side thereof; a head up display unit having a housing attached at a predetermined position at an interior portion of the installment panel; a reflective element mounted at a predetermined installed position within the housing; a light source removably attached to the housing of the head up display unit, the predetermined positions of the housing and the reflective element being maintained independently of attachment or removal of the light source.

DESCRIPTION OF THE PREFERRED EMBODIMENT

Figure 1:
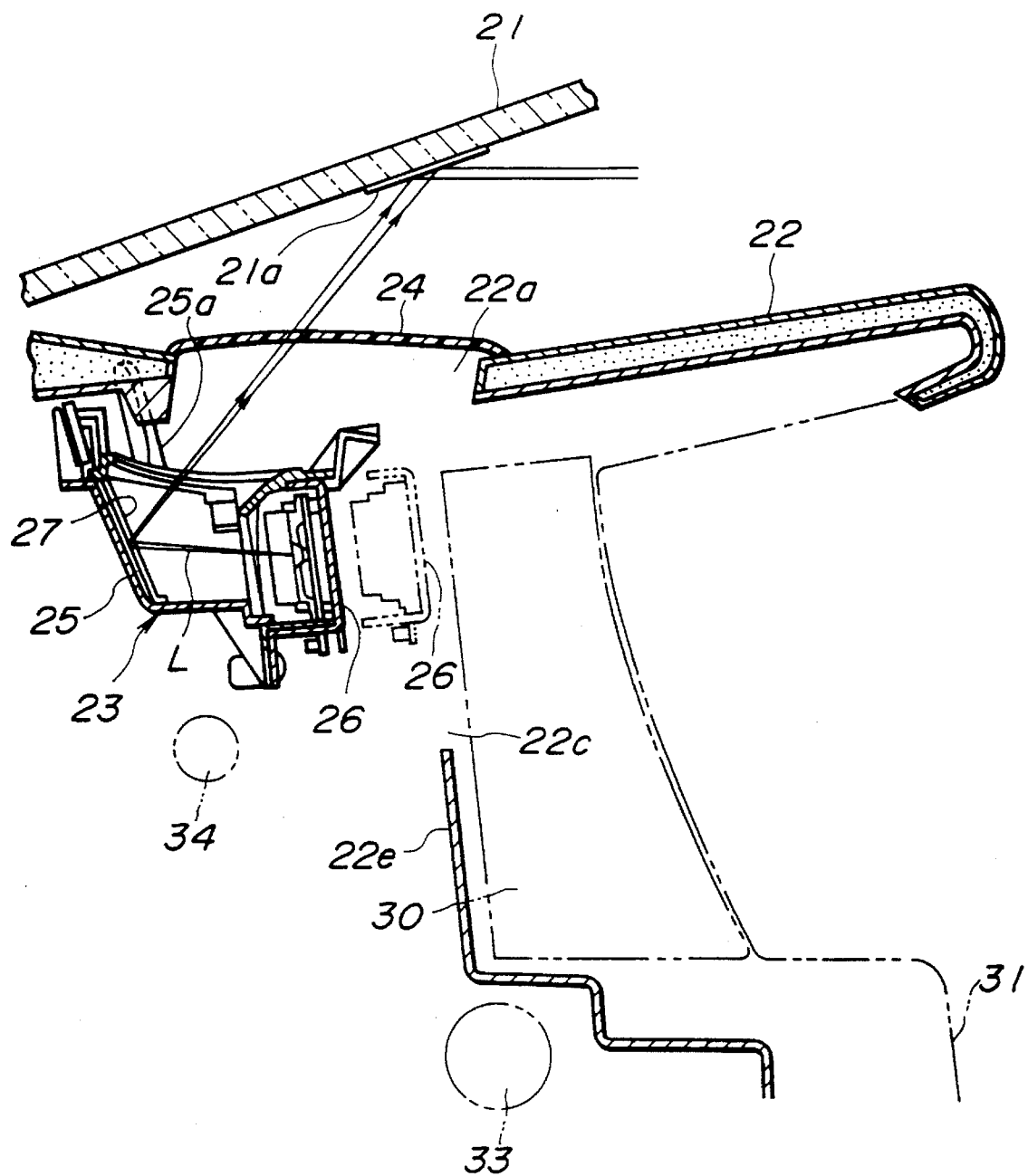
FIG. 1 is a cross-sectional view of a head up display installation according to a first preferred embodiment of the invention.

Referring now to the drawings, particularly to

Figure 2:
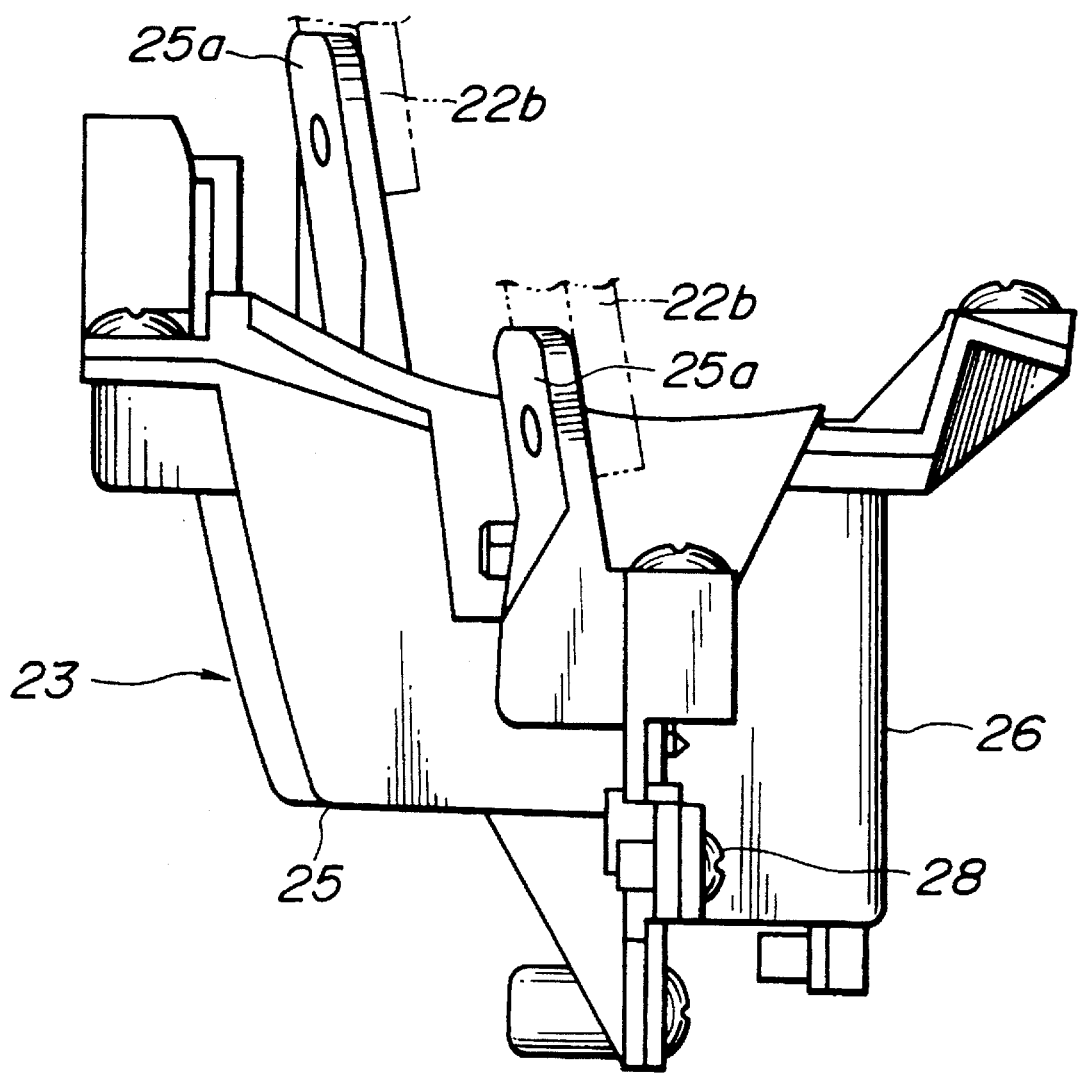
FIG. 2 is a side view of a head up display unit according to the preferred embodiment.
Figure 3:
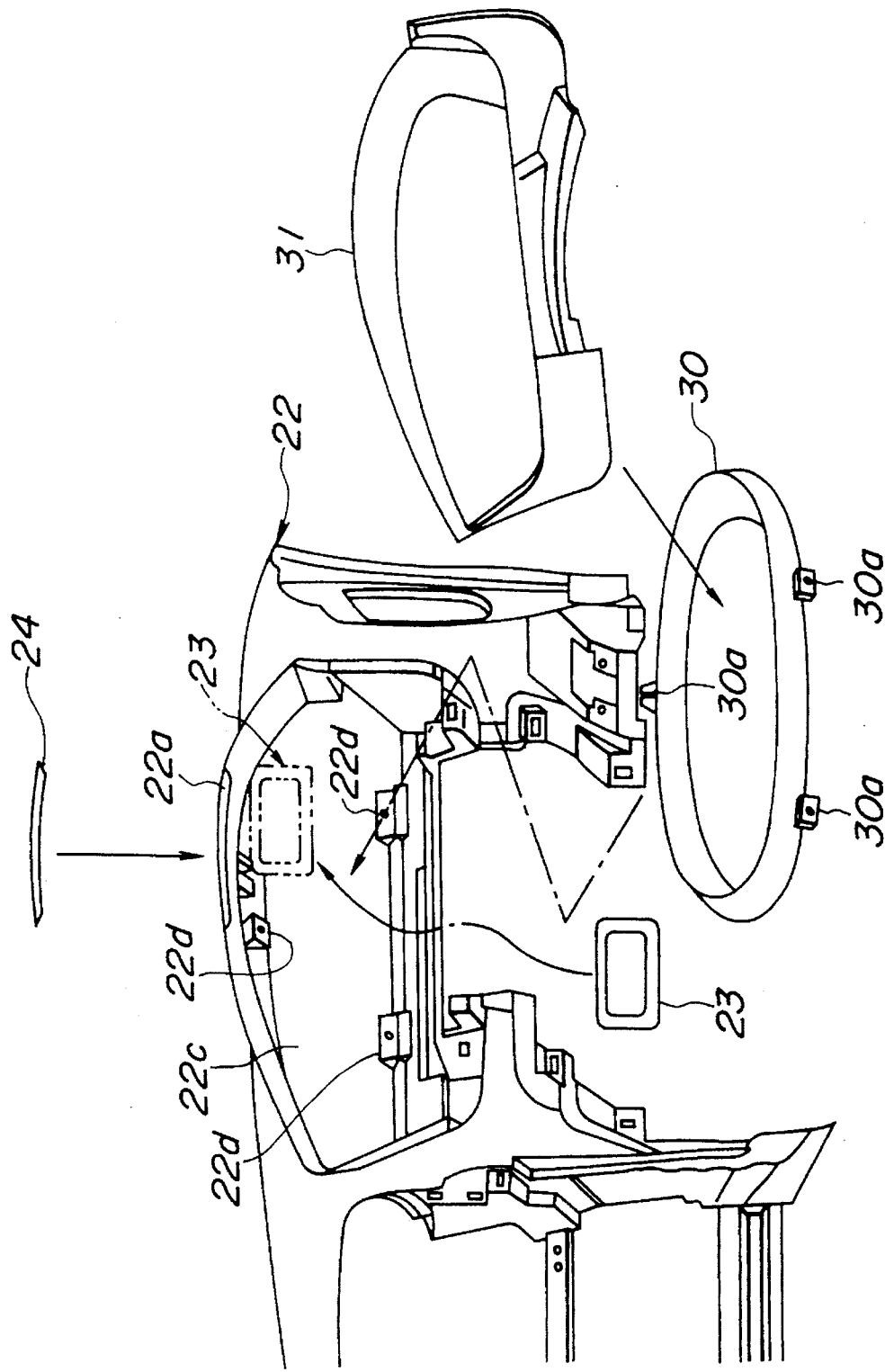
FIG. 3 is an exploded perspective view of the installation panel and assembly according to the invention.

FIGS. 1–3, a first embodiment of a head up display installation arrangement according to the invention will be described in detail.

The arrangement of the invention comprises a windshield panel 21 and an installment panel 22 having an opening 22a formed at an upper side thereof. A head up display unit (hereinbelow: display unit) 23 is mounted at a lower side of the opening 22a and a finisher 24 is disposed to cover the opening 22a.

The head up display unit 23 comprises a housing 25 having a high luminance fluorescent light 26 and a reflective element 27, such as a mirror or the like, mounted therein. Referring to FIG. 2, it may be seen that the fluorescent light is attached to the display unit 23 by screws 28 so as to be easily removable therefrom. Referring again to FIG. 1, a detached position of the fluorescent light 26 is represented by phantom lines. The housing 25 further has a projecting portion 25a at an upper side thereof which is fixed to an attachment portion 22b formed on the lower side of the installment panel 22 as seen in FIG. 2.

The light L which is output from the fluorescent light 26, in the form of a speed indication, or the like, is reflected from the mirror 27 to a reflective portion 21a of the windshield panel 21 so as to be within a driver's line of sight for easy viewing.

A meter 30 is further provided, as seen in FIGS. 1 and 3, installment portions 30a, 30a of the meter 30 are attached to installment portions 22d, 22d of the installment panel 22. A meter lid 31 is installed over the meter 30. Further, an access opening 22c is provided in a wall portion 22e of the installment panel 22. According to this construction, as seen in FIG. 1, components of the head up display unit 23 may be accessed via the access opening 22c via the meter 30 which may be easily removed.

Also shown in FIG. 1, are a steering member 33 and a defrost duct 34.

Hereinbelow, installation operation of the display unit 23 and the meter 30 will be explained in detail.

First the display unit 23 is mounted in the drivers side of the installment panel 22, after which the installment panel 22 is appropriately mounted to the vehicle body. Then the meter 30 is attached to the installment panel 22 at the installment portions 30a, 30a, 22d, 22d, via screws or the like and the meter lid 31 is installed over the meter 30 so as to cover the installment portions 30a, 30a.

According to this arrangement, the fluorescent light 26 of the display unit 23 may easily be serviced by removing the meter lid 31 and meter 30, thus exposing the access opening 22c through which the screws 28 can be removed for detaching the fluorescent light 26. According to this, the upper opening 22a of the installment panel 22 and the finisher 24 therefor, can be kept small. Also, since the remainder of the display unit 23 is attached to the installment panel 22, no readjustment of reflective elements is necessary and, since the access opening 22c is always covered by the meter 30, a pleasing appearance is always maintained.

Further, since only a single reflective element, the mirror 27 is utilized, a space required for installation as well as component costs may be suitably reduced.

Figure 4:
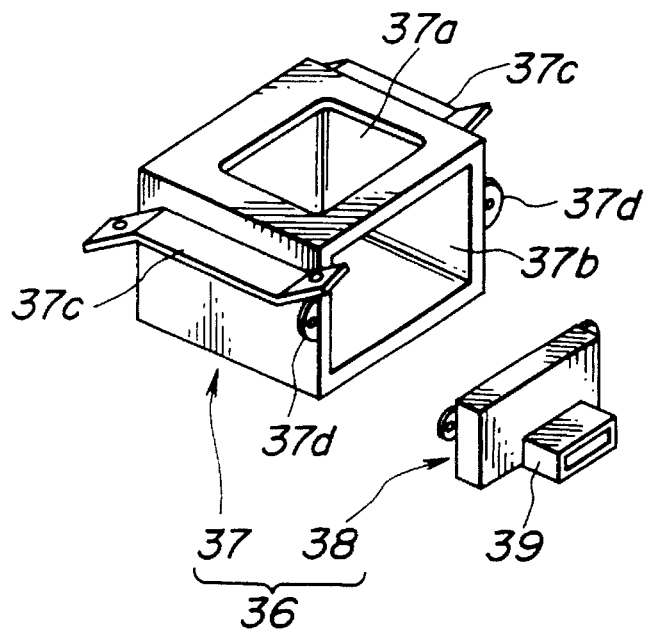
FIG. 4 is a perspective view of a second embodiment of a head up display unit.
Figure 5:
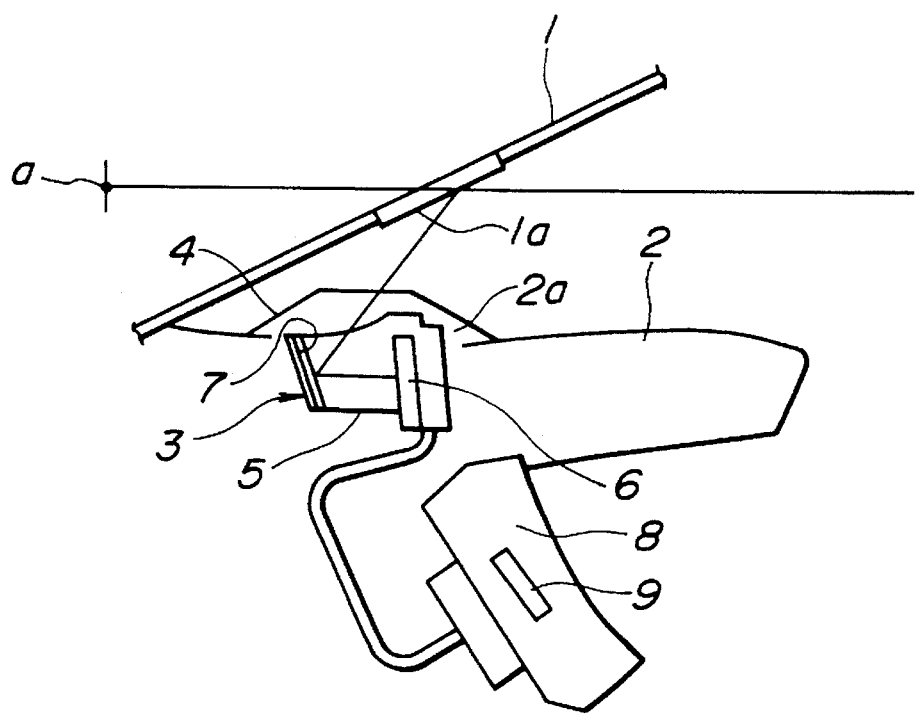
FIG. 5 is an explanatory view of a first conventional head up display installation.
Figure 6:
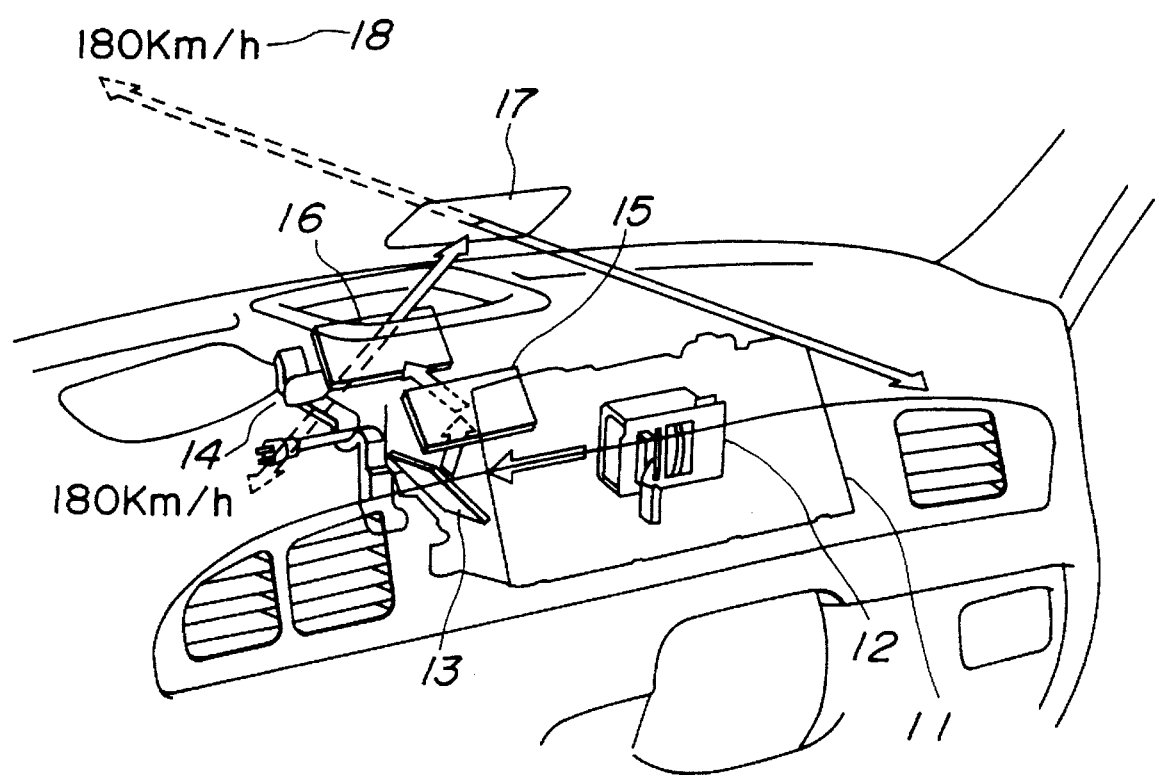
FIG. 6 is an explanatory view of a second type of conventionally known head up display installation.

Hereinbelow, a second embodiment of a head up display unit according to the invention will be explained in detail with reference to FIG. 4. It will be noted that the display unit 36 of the second embodiment may be utilized with the installation arrangement as described above without modification.

According to the second embodiment of the head up display unit 36, a substantially rectangular housing 37 is provided. A high luminance fluorescent light 38 is attached at one side thereof via screws, or the like, engaging with mounting members 37d, 37d provided at each side of an open end 37b of the display unit 36. An opening 37a is provided at a top side of the housing 37 for allowing projection of light L for forming the head up display, and installment portions 37c are provided on either side of the top opening 37a for attachment to corresponding attachment portions of the installment panel 22. A connector 39 is provided at a rear side of the fluorescent light 38 for allowing easy electrical connection thereof.

According to the above described alternative embodiment of a display unit 36, all the advantages of the previously described first embodiment are available.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A head up display installation for a vehicle, comprising:
    an installment panel having a first opening formed at an upper side thereof;
    a head up display unit having a housing attached at a predetermined position to an interior portion of said installment panel, for facilitating transmission of information displayed on said head up display unit;
    a reflective element mounted within said housing at a predetermined position for facilitating transmission of information displayed on said head up display unit;
    a light source which is attachable to and detachable from said housing of said head up display unit, said predetermined positions of said housing and said reflective element being maintained independently of attachment or removal of said light source; and
    an access opening provided at a front side of said installment panel and a meter removably mounted at a location on said front side of said installment panel so as to cover said access opening, said access opening allowing convenient access to one of said light source and circuitry related to said head up display;
    wherein attachment and removal of said light source from said housing maintains a focus of said light source in said head up display installation.

2. A head up display installation as set forth in claim 1, further including a finishing member installed over said meter.

3. A head up display installation as set forth in claim 1, further including a light receiving surface installed at a predetermined position on a windshield panel of said vehicle above said first opening and in alignment with a reflecting direction of said reflective element.

4. A head up display installation as set forth in claim 1, further including a transparent cover portion mounted over said first opening.

5. A head up display installation as set forth in claim 4, wherein the size of said transparent cover is substantially equal to said first opening.

6. A head up display installation as set forth in claim 1, wherein said housing is substantially rectangular in shape, has at least one open side and includes means for removably mounting said light source on a side other than said open side.

7. A head up display installation as set forth in claim 1, wherein, in an installed condition of said head up display unit, a mounting of said light source is positioned proximate said access opening.

8. A head up display installation as set forth in claim 1, wherein said meter is operatively connected to said head up display unit.

9. A head up display installation as set forth in claim 1, wherein said light source is a single replaceable unit.

10. A vehicular head up display installation, comprising:
    a head up display unit including a housing containing a removably mounted light source and a permanently mounted first fixed reflective element, said housing being configured such that removal of said light source does not alter an alignment of said first fixed reflective element, said housing further having at least one installation portion formed thereon;

a second fixed reflective element having a predetermined angular relation to said first fixed reflective element, said second fixed reflective element being provided on a fixedly mounted vehicular windshield;

structural members integral to said housing and engageable with corresponding members formed on a body portion of said light source, said structural members of said housing being positioned such that, according to attachment to said housing, said light source is mounted, aimed and focused in relation to said first and second fixed reflective elements such that an output of said light source is reflected from said first fixed reflective element to said second fixed reflective element;

an installment panel fixedly mounted below said vehicular windshield and including:

at least one attachment portion engageable with said installation portion of said housing so as to install said head up display unit at an operational position;

a first opening defined in an upper side of said installment panel and positioned between said first and second fixed reflective elements;

a second opening, defined in a wall portion of said installment panel covering said head up display unit, said second opening facilitating access to a mounted position of said light source at a location substantially opposing said operational position of said head up display unit; and a meter removably attached over said second opening of said installment panel;

wherein attachment and removal of said light source from said housing maintains said focus of said light source in said vehicular head up display installation.

11. A head up display installation as set forth in claim 10, wherein said meter has a finished member installed thereover.

12. A head up display installation as set forth in claim 10, further including a transparent cover portion mounted over said first opening.

13. A head up display installation as set forth in claim 10, wherein said light source is a single replacement unit.

14. A head up display installation as set forth in claim 10, wherein said meter is operatively connected to said head up display unit.

15. A head up display installation for a vehicle, comprising:

and installment panel having a first opening formed at an upper side thereof;

a head up display unit having a housing attached at a predetermined position at an interior portion of said installment panel;

a reflective element mounted at a predetermined installed position within said housing;

a light receiving display surface installed at a predetermined position on a windshield panel of said vehicle above said opening and in alignment with a reflecting direction of said reflective element; and a light source removably attached to said housing, said housing and said light source being arranged so that attachment of said light source to said housing positionally aligns said light source with said reflective element to assure correctly aligned light transmission from the light source to said light receiving display surface.

16. A head up display installation as set forth in claim 15, wherein said light source is a single replaceable unit.

* * * * *